I. T. Price,
Hay Fork.
No. 55,902.  Patented June 26, 1866.

Isaac T. Price,
by atty,
Jo. C. Clayton.

UNITED STATES PATENT OFFICE.

ISAAC T. PRICE, OF LEESVILLE, OHIO.

IMPROVEMENT IN HORSE HAY-FORKS.

Specification forming part of Letters Patent No. 55,902, dated June 26, 1866.

*To all whom it may concern:*

Be it known that I, ISAAC T. PRICE, of Leesville, in the county of Carroll and State of Ohio, have invented certain new and useful Improvements in Hay-Forks; and I do hereby declare the following to be a full, clear, and exact description thereof, reference being had to the accompanying drawings and the letters of reference thereon marked, forming a part of this specification.

Figure 3:
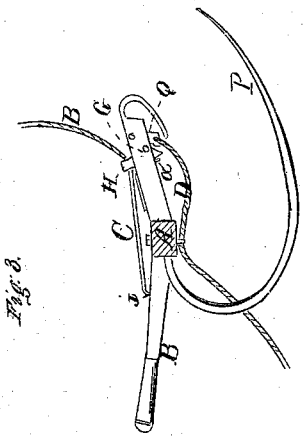
Figure 2:
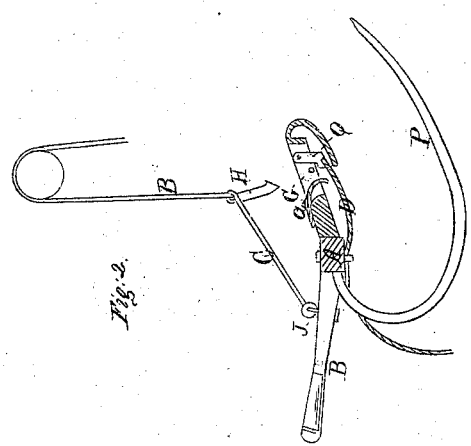
Figure 1:
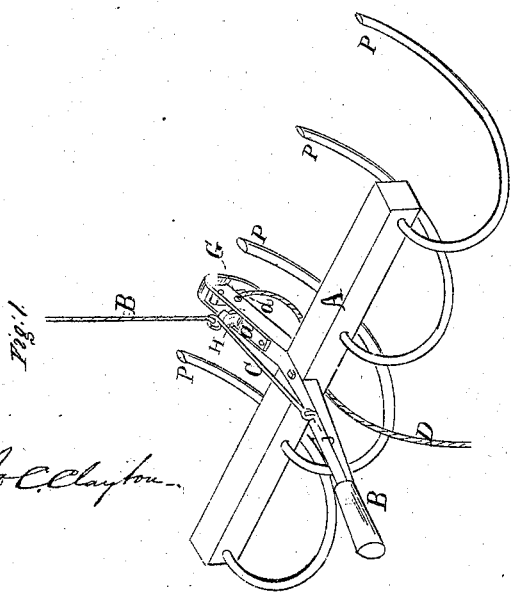

In the drawings, Figure 1 is a perspective view of the fork. Fig. 2 is a longitudinal section of the handle, showing the slot, hook, spring, and catch. Fig. 3 is a side view of the handle with the hook in place for holding and ready with the ropes for lifting the fork.

The nature of my invention consists in the arrangement of the hook and catch so as to hold the fork on a balance until lifted, and then detaching the hook from the catch and allowing the link to hold up the fork unbalanced, by this means discharging the hay from the fork.

In order to enable others skilled in the art to make and use my invention, I will describe its construction and operation.

In Fig. 1, A is the head of the fork, into which the prongs are fastened, (marked $p$.) These prongs are curved so as to hold the hay during the time the hook H is hitched, and so arranged that the fork when loaded is balanced on the hook H until lifted by the rope B, extended over the pulley to the desired height.

In Fig. 2, B is the handle, firmly secured to head A. That part of the handle to be taken hold of by the hand is made of a convenient length; and that portion of the handle extending out from the head over the points of the prongs is made of a suitable length, and in this portion there is a slot within which there is a trigger, Q, and a catch, G, onto which the hook H catches to lift the fork and hay. There is a link, C, (which may be constructed of metal, as in Fig. 2, or a rope, as in Fig. 3,) to which this hook is attached, extending to the rear of the head onto the handle, to which it is secured by an eyebolt, or other suitable means, on which the fork swings when relieved of the hay. A rope, D, is secured to the lower end of the trigger Q, for unhitching the hook H from catch G.

In operating my fork, it is swung on a pulley (see Fig. 2) by rope B, one end of which is attached to hook H, which is connected with the metal or rope link C, which extends to $i$ on the handle in the rear of the head A or far enough for the fork to be unbalanced, when the hook is unhitched and the fork is suspended by the metal link C. To lift the fork with its load of hay the hook H is forced through the slot and pressed by the spring $a$, so as to hitch onto the catch G. The fork and the hay are then drawn up to where desired by means of rope B and pulley. Now, by pulling the rope D the trigger Q knocks off or unhitches the hook H from catch G, and the hay is then discharged, and the fork hangs at the end of the metal link C, opposite the hook H, unbalanced and ready to be lowered and filled again.

The peculiar advantages of my invention consist in its simple construction and its easy adjustability when in operation, and also in lifting the hay from the wagon as it lies—that is, in a straight and untangled condition—causing it to lie closely in the mow or on the stack.

Having thus fully described my invention, what I claim as new, and desire to secure by Letters Patent, is—

1. The combination and arrangement of link C, hook H, catch G, and trigger Q, substantially as and for the purposes set forth.

2. The construction and arrangement of the handle B, head A, and prongs $p$.

In testimony that I claim the above I have hereunto set my hand.

ISAAC T. PRICE.

In presence of—
WILLIAM STINE,
J. M. FORRESTER.